US010685606B2

(12) United States Patent
Hsu et al.

(10) Patent No.: US 10,685,606 B2
(45) **Date of Patent: *Jun. 16, 2020**

(54) BACKLIGHT CONTROL METHOD AND CELL PHONE USING THE SAME

(71) Applicant: PixArt Imaging Inc., Hsin-Chu County (TW)

(72) Inventors: En-Feng Hsu, Hsin-Chu County (TW); Meng-Huan Hsieh, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,745

(22) Filed: Jan. 7, 2020

(65) Prior Publication Data

US 2020/0143757 A1 May 7, 2020

Related U.S. Application Data

(63) Continuation of application No. 16/360,226, filed on Mar. 21, 2019, now Pat. No. 10,580,363, which is a continuation of application No. 16/126,382, filed on Sep. 10, 2018, now Pat. No. 10,297,208, which is a continuation of application No. 15/253,397, filed on Aug. 31, 2016, now Pat. No. 10,127,866, which is a continuation of application No. 13/783,613, filed on Mar. 4, 2013, now abandoned.

(30) Foreign Application Priority Data

Mar. 5, 2012 (TW) .......................... 1011072859 A

(51) Int. Cl.
*H04M 1/00* (2006.01)
*G09G 3/34* (2006.01)
*G09G 3/36* (2006.01)

(52) U.S. Cl.
CPC ......... *G09G 3/3406* (2013.01); *G09G 3/3648* (2013.01); *G09G 2320/0626* (2013.01); *G09G 2330/021* (2013.01); *G09G 2360/144* (2013.01)

(58) Field of Classification Search
CPC ........... H04M 1/10; H04M 2203/2094; H04M 1/72538; H04M 2250/22
See application file for complete search history.

*Primary Examiner* — Pakee Fang
(74) *Attorney, Agent, or Firm* — WPAT, PC

(57) ABSTRACT

There is provided a portable electronic device including a backlight module, an ambient light sensor, a proximity sensor and a processing unit. The backlight module illuminates with backlight brightness. The ambient light sensor is configured to detect ambient light intensity. The proximity sensor is configured to detect an object. The processing unit is configured to activate the proximity sensor when the ambient light intensity detected by the ambient light sensor is lower than a predetermined value or decreases more than a predetermined range, and to maintain or reduce the backlight brightness according to a detection result of the proximity sensor. There is further provided an automatic detection method.

9 Claims, 4 Drawing Sheets

BACKLIGHT CONTROL METHOD AND CELL PHONE USING THE SAME

CROSS REFERENCE TO RELATED APPLICATION

This application is a continuation application of U.S. application Ser. No. 16/360,226, filed on Mar. 21, 2019, which is a continuation application of U.S. application Ser. No. 16/126,382, filed on Sep. 10, 2018, which is a continuation application of U.S. application Ser. No. 15/253,397, filed on Aug. 31, 2016, which is a continuation application of U.S. application Ser. No. 13/783,613, filed on Mar. 4, 2013 and claims the priority benefit of Taiwan Patent Application Serial Number 101107289, filed on Mar. 5, 2012, the full disclosure of which are incorporated herein by reference.

BACKGROUND

1. Field of the Disclosure

This disclosure generally relates to a detection device and a detection method and, more particularly, to an automatic detection method and a portable electronic device using the same.

2. Description of the Related Art

Because portable electronic devices are convenient for use, they are becoming indispensable to daily lives. However, as the battery used in portable electronic devices has limited capacity, in order to extend the lifetime of the battery, how to reduce the power consumption of the portable electronic devices becomes an important researching topic.

For example in an electronic device employing a liquid crystal display panel, it is an effective method to save power by real-timely adjusting backlight brightness of the liquid crystal display panel. Referring to FIG. 1, said electronic device generally has an ambient light sensor 91 configured to detect the variation of ambient light and the ambient light sensor 91 is disposed inside a case 92 of the electronic device. A transparent window 93 is formed in front of the ambient light sensor 91 so that ambient light can penetrate the transparent window 93 to be received by the ambient light sensor 91. In order to reduce the total power consumption of the electronic device, when the ambient light sensor 91 detects that the ambient light becomes weak (e.g. entering the indoor), the backlight brightness of the electronic device is reduced. However in some conditions, for example when the ambient light sensor 91 is blocked by an object, the ambient light detected thereby can also become weak. And if the backlight brightness is reduced accordingly, the display performance can be degraded.

Accordingly, the present disclosure further provides an automatic detection method and a portable electronic device using the same that may avoid the error in the conventional technology aforementioned.

SUMMARY

It is an object of the present disclosure to provide an automatic detection method and a portable electronic device capable of accurately controlling the backlight adjustment.

It is another object of the present disclosure to provide an automatic detection method adapted to control backlight brightness of a portable electronic device, wherein the portable electronic device includes an ambient light sensor and a proximity sensor.

It is another object of the present disclosure to provide an automatic detection method adapted to control backlight brightness of a cell phone, wherein the cell phone includes an ambient light sensor and a proximity sensor.

The present disclosure provides a backlight control method of a cell phone, and the cell phone includes an ambient light sensor and a proximity sensor. The backlight control method includes: activating the ambient light sensor to detect ambient light; not activating the proximity sensor when the ambient light detected by the ambient light sensor does not decrease; activating the proximity sensor to detect an object when the ambient light detected by the ambient light sensor decreases to be lower than a predetermined value; maintaining backlight brightness when the proximity sensor detects the object due to that the decreasing of the ambient light is caused by the object blocking the ambient light but not by weakening of the ambient light; and detecting an incoming signal, and when the incoming signal is received, further comprising: activating the ambient light sensor and the proximity sensor; setting the backlight brightness to zero when the proximity sensor detects the object; and adjusting the backlight brightness according to the ambient light detected by the ambient light sensor when the proximity sensor does not detect the object.

The present disclosure further provides a backlight control of a cell phone, and the cell phone includes an ambient light sensor and a proximity sensor. The backlight control method includes: detecting an incoming signal; activating the ambient light sensor to detect an intensity value of ambient light and executing following steps when the incoming signal is not received: not activating the proximity sensor when the intensity value of ambient light does not decrease; activating the proximity sensor to detect an object when an intensity variation of the intensity value decreases more than a predetermined variation range; and maintaining the backlight brightness when the proximity sensor detects the object due to that the decreasing of the intensity value is caused by the object blocking the ambient light but not by weakening of the ambient light; and activating the ambient light sensor and the proximity sensor, and executing following steps when the incoming signal is received: setting the backlight brightness to zero when the proximity sensor detects the object; and adjusting the backlight brightness according to the intensity value of ambient light detected by the ambient light sensor when the proximity sensor does not detect the object.

The present disclosure further provides a cell phone including a display, an ambient light sensor, a proximity sensor and a processor. The display is configured to display images using a display brightness. The ambient light sensor is configured to detect ambient light intensity. The proximity sensor is configured to detect an object. The processor is configured to activate the ambient light sensor to detect the ambient light intensity, without yet activating the proximity sensor, not activate the proximity sensor when the ambient light intensity detected by the ambient light sensor does not decrease, activate the proximity sensor to detect an object when the ambient light intensity detected by the ambient light sensor decreases to be lower than a predetermined value, maintain the display brightness due to that the decreasing of the ambient light intensity caused by the object, detected by the proximity sensor, blocking ambient light but not by weakening of the ambient light, detect an incoming signal and activate the ambient light sensor and the proximity sensor when the incoming signal is received, set the display brightness to zero when the proximity sensor detects the object, and adjust the display brightness according to the ambient light intensity detected by the ambient light sensor when the proximity sensor does not detect the object.

In the automatic detection method and the portable electronic device of the present disclosure, a proximity sensor is used to further confirm a detection result of the ambient light sensor so as to effectively increase the accuracy of controlling the backlight brightness.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
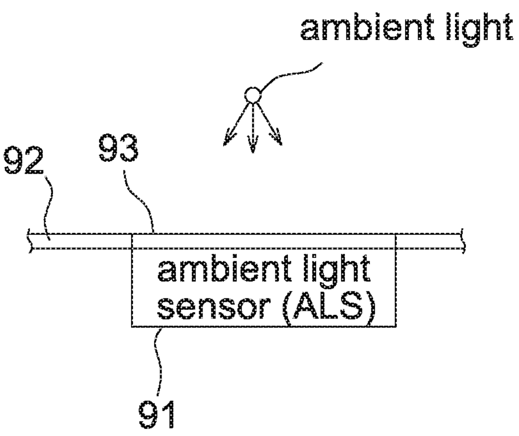
FIG. 1 (Prior Art)
FIG. 1 shows a schematic diagram of a conventional ambient light sensor.
Figure 2:
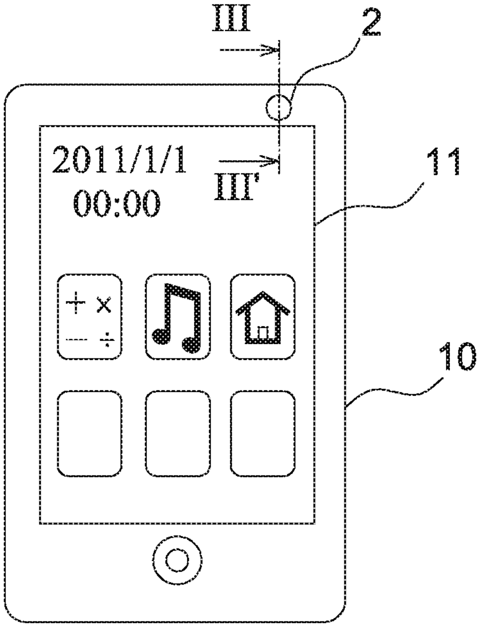
FIG. 2 shows a schematic diagram of the portable electronic device according to an embodiment of the present disclosure.

Referring to FIG. 2, it shows a schematic diagram of the portable electronic device 10 according to an embodiment of the present disclosure. The portable electronic device 10 may employ a liquid crystal panel as a display unit 11. The portable electronic device 10 may be, for example, a notebook computer, a cell phone, an MP3 player and a personal digital assistance (PDA), but not limited thereto. A liquid crystal panel includes a backlight module, and in this embodiment backlight brightness of the backlight module may be adjusted according to a detection result of a detection module 2. For example, when the ambient light becomes weak, the backlight brightness is reduced to save the total power consumption and two different sensors are used in this embodiment for double checking; and when the ambient light becomes strong, the backlight brightness is increased to improve the display performance.

Figure 3:
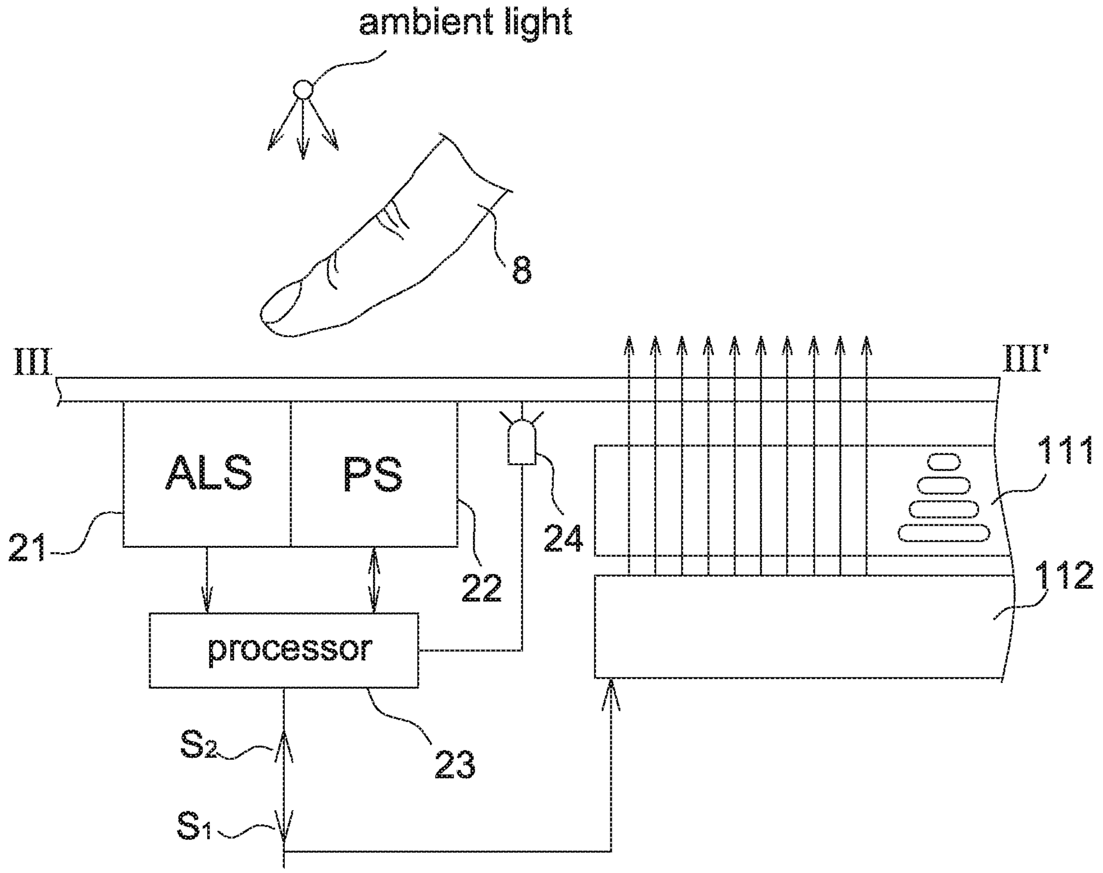
FIG. 3 shows a cross-sectional view taken along the line of the portable electronic device shown in FIG. 2.

Referring to FIG. 3, it shows a cross-sectional view taken along the line III-III' of the portable electronic device 10 shown in FIG. 2. It is appreciated that the size and the spatial relationship of every element in FIG. 3 have been altered for illustration purpose. In this embodiment the portable electronic device 10 includes a display unit 11 and a detection module 2.

The display unit 11 is configured to display images and includes a liquid crystal display unit 111 and a backlight module 112, wherein the backlight module 112 illuminates with backlight brightness so as to provide backlight needed by the liquid crystal display unit 111 in displaying images. In other words, the liquid crystal display unit 111 and the backlight module 112 may compose a liquid crystal display panel.

The detection module 2 includes an ambient light sensor (ALS) 21, a proximity sensor (PS) 22 and a processing unit 23. It is appreciated that the processing unit 23 may be the processor of the portable electronic device 10 or an independent processor. The ambient light sensor 21 is configured to detect ambient light intensity or a variation of the ambient light intensity and sends the detection result to the processing unit 23. The proximity sensor 22 is configured to detect whether an object 8 is approaching or not and sends the detection result to the processing unit 23, wherein embodiments of the proximity sensor 22 include a capacitive, an inductive, an electromagnetic, an optical, a microwave or an ultrasonic proximity sensor. For example, when the proximity sensor 22 is an optical proximity sensor, the portable electronic device 10 may further include an active light source 24 configured to illuminate the object 8, wherein the object 8 may be any object without any limitation, e.g. a finger shown herein, capable of blocking the ambient light sensor 21 from receiving ambient light, and the active light source 24 may be any proper light source.

The processing unit 23 is configured to activate the proximity sensor 22 when the ambient light intensity detected by the ambient light sensor 21 is lower than a predetermined value or decreases more than a predetermined range, and to maintain or reduce the backlight brightness of the backlight module 112 according to a detection result of the proximity sensor 22. The processing unit 23 further outputs a control signal $S_1$ according to a detection result of the detection module 2 so as to control the operation of the backlight module 112 (e.g. adjusting the backlight brightness or deactivating the backlight module 112) and/or to control the operation of the portable electronic device 10 (e.g. deactivating a button function and/or a touch control function). When the portable electronic device 10 is a cell phone, the processing unit 23 may further detect an incoming phone call at any time and accordingly controls the operation of the detection module 2. For example, when the incoming phone call $S_2$ is detected, the ambient light sensor 21 and the proximity sensor 22 are activated simultaneously; and when the incoming phone call $S_2$ is not detected, only the ambient light sensor 21 is activated (described later).

Figure 4:
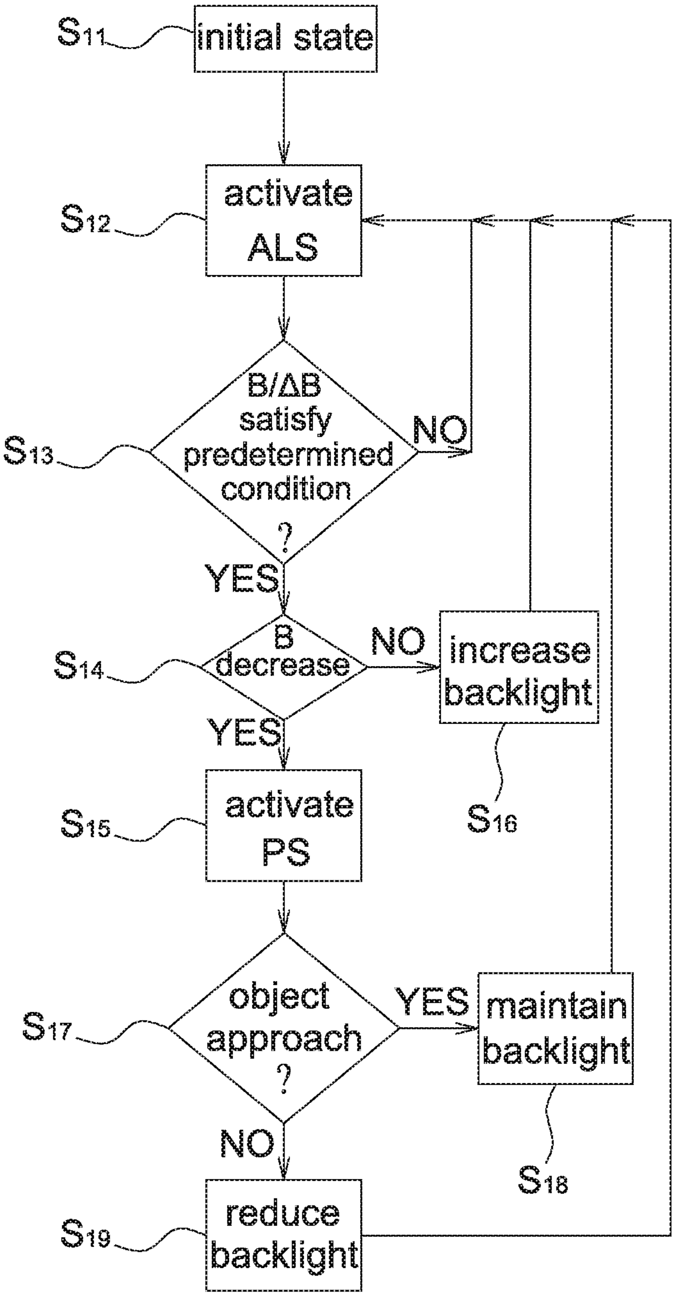
FIG. 4 shows a flow chart of the automatic detection method according to an embodiment of the present disclosure.

Referring to FIG. 4, it shows a flow chart of the automatic detection method according to an embodiment of the present disclosure. The automatic detection method is adapted to control backlight brightness of a portable electronic device 10, which includes an ambient light sensor 21 and a proximity sensor 22. The automatic detection method includes the steps of: entering an initial state (Step $S_{11}$); activating the ambient light sensor to detect ambient light (Step $S_{12}$); identifying an intensity value B or an intensity variation $\Delta B$ of the ambient light (Step $S_{13}$); returning to the Step $S_{12}$ when the intensity value or the intensity variation does not satisfy a predetermined condition or executing following steps when the intensity value or the intensity variation satisfies the predetermined condition: identifying the intensity value (Step $S_{14}$); activating the proximity sensor when the intensity value decreases (Step $S_{15}$); increasing the backlight brightness when the brightness value does not decrease (Step $S_{16}$); identifying whether an object is approaching or not (Step $S_{17}$); maintaining the backlight brightness when the proximity sensor detects an object approaching (Step $S_{18}$); and reducing the backlight brightness when the proximity sensor does not detect the object (Step $S_{19}$).

Referring to FIGS. 3 and 4, details of every step in this embodiment will be described hereinafter.

The portable electronic device 10 is in a normal operating state initially and it is referred to an initial state herein (Step $S_{11}$).

The ambient light sensor (ALS) 21 is activated to continuously detect ambient light. Preferably in the normal operating state of the portable electronic device 10 the ambient light sensor 21 detects the ambient light periodically with a fixed time period (Step $S_{12}$) and sends detection results to the processing unit 23.

The processing unit 23 identifies whether an intensity value B or an intensity variation $\Delta B$ of the ambient light detected by the ambient light sensor 21 satisfies a predetermined condition or not (Step $S_{13}$), wherein satisfying the predetermined condition may be the intensity value B exceeding a predetermined intensity range or the intensity variation $\Delta B$ exceeding a predetermined variation range.

When the processing unit 23 identifies that the intensity value B exceeds the predetermined intensity range or the intensity variation $\Delta B$ exceeds the predetermined variation range (Step $S_{14}$), it means that the variation of ambient light is apparent enough to affect the display performance of the display unit 11 and thus the backlight brightness may be adjusted. For example, when the intensity value of the ambient light is lower than a predetermined value or decreases more than a predetermined range, the processing unit 23 activates the proximity sensor 22 (Step $S_{15}$) so as to double confirm whether to adjust the backlight brightness. On the contrary, when the intensity value does not decrease (e.g. the intensity value of the ambient light being larger than a predetermined value or increasing more than a predetermined range), the backlight brightness is increased (Step $S_{16}$) so as to improve the display performance and then the process returns to the Step $S_{12}$. On the other hand, when the processing unit 23 identifies that the intensity value does not exceed the predetermined intensity range or the intensity variation does not exceed the predetermined variation range (i.e. the predetermined condition not satisfied), it is not necessary to perform any adjustment and the process returns to the Step $S_{12}$.

In order to further confirm whether to perform the adjustment, the processing unit 23 then identifies whether an object is approaching the proximity sensor 22 or not, i.e. approaching the portable electronic device 10 (Step $S_{17}$). When the proximity sensor 22 detects an object 8 is approaching, the processing unit 23 controls the backlight module 112 to maintain the backlight brightness since the decreasing of ambient light now is caused by the object 8 blocking the ambient light sensor 21 but not by the weakening of the ambient light (Step $S_{18}$). On the contrary, when the proximity sensor 22 does not detect the object 8, the processing unit 23 controls the backlight module 112 to reduce the backlight brightness since the ambient light really becomes weak in this case, and the power consumption can be saved by reducing the backlight brightness (Step $S_{19}$). After the Steps $S_{16}$, $S_{18}$ and $S_{19}$ are executed, the process returns to the Step $S_{12}$.

Figure 5:
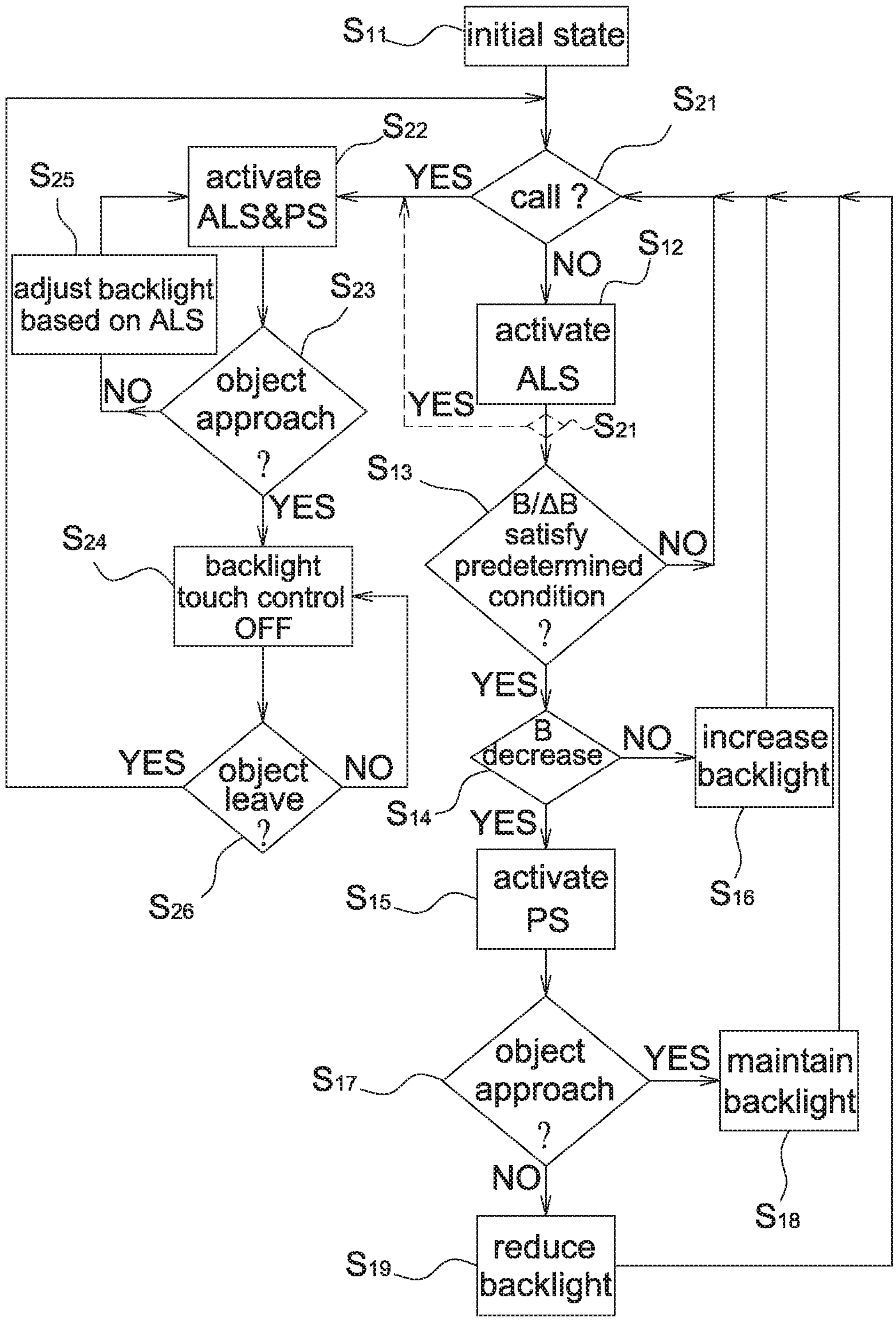
FIG. 5 shows a flow chart of the automatic detection method according to another embodiment of the present disclosure.

Referring to FIG. 5, it shows a flow chart of the automatic detection method according to another embodiment of the present disclosure. The automatic detection method is adapted to control backlight brightness of a cell phone, which also includes the ambient light sensor 21 and the proximity sensor 22. The automatic detection method also includes the Steps $S_{11}$~$S_{19}$ of FIG. 4. As the cell phone may detect an incoming phone call at first and then performs the control of the detection module 2, the automatic detection method in this embodiment may further include the steps of: detecting an incoming phone call (Step $S_{21}$), wherein when the incoming phone call is not detected, only the ambient light sensor is activated to detect an intensity value of ambient light and the Steps $S_{12}$~$S_{19}$ are executed, and when the incoming phone call is detected, Steps $S_{22}$~$S_{26}$ are executed including: activating the ambient light sensor and the proximity sensor simultaneously (Step $S_{22}$); identifying whether an object is approaching or not (Step $S_{23}$); setting the backlight brightness to zero, i.e. deactivating the backlight module, when the proximity sensor detects an object approaching (Step $S_{24}$); adjusting the backlight brightness according to the ambient light detected by the ambient light sensor when the proximity sensor does not detect the object (Step $S_{25}$); that is, reducing the backlight brightness so as to reduce the power consumption when the ambient light becomes weak and increasing the backlight brightness so as to improve the display performance when the ambient light becomes strong, and then returning to the Step $S_{22}$; identifying whether the object has left or not (Step $S_{26}$), wherein when the proximity sensor detects that the object has left, the process returns to the Step $S_{21}$ to detect another incoming phone call, and when the proximity sensor detects that the object has not left, the process returns to the Step $S_{24}$ to set the backlight brightness to zero continuously. It should be mentioned that the Step $S_{21}$ may be executed between the Steps $S_{11}$ and $S_{12}$ or between the Steps $S_{12}$ and $S_{13}$.

Referring to FIGS. 3 and 5, details of every step in this embodiment will be described hereinafter.

Similarly, the cell phone is in a normal operating state initially which is referred to an initial state herein (Step $S_{11}$).

The processing unit 23 detects an incoming phone call $S_2$ at any time (Step $S_{12}$), and when the processing unit 23 does not detect the incoming phone call, the Steps $S_{12}$~$S_{19}$ are executed and details thereof are similar to those described in FIG. 4 and corresponding descriptions and will not be repeated herein. In brief, when the processing unit 23 does not detect the incoming phone call, the processing unit 23 only activates the ambient light sensor 21 to detect an intensity value of ambient light and executes following steps: activating the proximity sensor 22 when the intensity value is lower than a predetermined value or decreases more than a predetermined range; maintaining the backlight brightness when the proximity sensor 22 detects an object 8 is approaching; and reducing the backlight brightness when the proximity sensor 22 does not detect the object 8.

When the processing unit 23 detects the incoming phone call $S_2$, the ambient light sensor (ALS) 21 and the proximity sensor (PS) 22 are simultaneously activated (Step $S_{22}$).

The processing unit 23 then identifies whether an object is approaching the proximity sensor 22 or not, i.e. approaching the cell phone (Step $S_{23}$). When the proximity sensor 22 detects that the object 8 is approaching, the processing unit 23 controls the backlight module 112 to set the backlight brightness to zero, i.e. deactivating the backlight module 112 so as to save power; that is, now the user is putting the cell phone to his or her ear to have a talk such that the processing unit 23 may deactivate the backlight and further may deactivate a button function and/or a touch control function so as to save power as well as to avoid error due to incidentally touch (Step $S_{24}$). On the contrary, when the proximity sensor 22 does not detect the object 8, the processing unit 23 may adjust the backlight brightness according to the ambient light intensity detected by the ambient light sensor 21 since now the user does not put the cell phone to his or her ear to have a talk such that the backlight brightness may be reduced when the ambient light intensity detected by the ambient light sensor 21 becomes weak or the backlight brightness may be increased when the ambient light intensity detected by the ambient light sensor 21 becomes strong (Step $S_{25}$). Next, Steps $S_{22}$ and $S_{23}$ are executed repeatedly so as to detect the usage state of the user.

When the processing unit 23 detects the incoming phone call $S_2$ (Step $S_{21}$) and the proximity sensor 22 detects the object 8 is approaching (Step $S_{23}$) and the Step $S_{24}$ is executed as well, the processing unit 23 further identifies whether the object 8 has left or not (Step $S_{26}$). When the proximity sensor 22 detects that the object 8 has left, it indicates that the user has ended the talk such that the process returns to the Step $S_{21}$ and the processing unit 23 starts to detect a next incoming phone call; on the contrary, when the proximity sensor 22 detects that the object 8 has not left, it indicates that the user is still talking such that the processing unit 23 continuously sets the backlight brightness to zero to save the power consumption. Of course, the button function and the touch control function may be deactivated simultaneously when the backlight is deactivated.

It should be mentioned that in the above embodiments, the method that the proximity sensor 22 detects whether an object is approaching or not is different according to different types of the proximity sensor and the method may be designed according to the setting of the user and the above embodiments are only exemplary.

As mentioned above, as conventional electronic devices only use an ambient light sensor to detect an ambient light variation to accordingly adjust the backlight brightness, an error may be introduced when there is an object approaches the ambient light sensor. The present disclosure further provides an automatic detection method (FIGS. 4 and 5) and a portable electronic device using the same (FIGS. 2 and 3) that may use a proximity sensor to further confirm the detection result of an ambient light sensor so as to effectively increase the accuracy of controlling the backlight brightness.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A backlight control method of a cell phone, the cell phone comprising an ambient light sensor and a proximity sensor, the backlight control method comprising:
- activating the ambient light sensor to detect ambient light;
- not activating the proximity sensor when the ambient light detected by the ambient light sensor does not decrease;
- activating the proximity sensor to detect an object when the ambient light detected by the ambient light sensor decreases to be lower than a predetermined value;
- maintaining backlight brightness when the proximity sensor detects the object due to that the decreasing of the ambient light is caused by the object blocking the ambient light but not by weakening of the ambient light;
- detecting an incoming signal, and when the incoming signal is received, further comprising:
  - activating the ambient light sensor and the proximity sensor;
  - setting the backlight brightness to zero when the proximity sensor detects the object; and
  - adjusting the backlight brightness according to the ambient light detected by the ambient light sensor when the proximity sensor does not detect the object; and
- when the incoming signal is received and the proximity sensor detects the object, further comprising:
  - deactivating a button function and a touch control function;
  - detecting another incoming signal when the proximity sensor detects that the object has left; and
  - setting the backlight brightness to zero continuously when the proximity sensor detects that the object has not left.

2. The backlight control method as claimed in claim 1, further comprising:
- increasing the backlight brightness when the ambient light detected by the ambient light sensor increases.

3. The backlight control method as claimed in claim 1, wherein in the activating the ambient light sensor before the incoming signal is received, the proximity sensor is not activated yet.

4. A backlight control method of a cell phone, the cell phone comprising an ambient light sensor and a proximity sensor, the backlight control method comprising:
- detecting an incoming signal;
- activating the ambient light sensor to detect an intensity value of ambient light and executing following steps when the incoming signal is not received:
  - not activating the proximity sensor when the intensity value of ambient light does not decrease;
  - activating the proximity sensor to detect an object when an intensity variation of the intensity value decreases more than a predetermined variation range;
  - maintaining the backlight brightness when the proximity sensor detects the object due to that the decreasing of the intensity value is caused by the object blocking the ambient light but not by weakening of the ambient light; and
- activating the ambient light sensor and the proximity sensor, and executing following steps when the incoming signal is received:
  - setting the backlight brightness to zero when the proximity sensor detects the object; and
  - adjusting the backlight brightness according to the intensity value of ambient light detected by the ambient light sensor when the proximity sensor does not detect the object; and
- when the incoming signal is received and the proximity sensor detects the object, further comprising:
  - deactivating a button function and a touch control function;
  - detecting another incoming signal when the proximity sensor detects that the object has left; and
  - setting the backlight brightness to zero continuously when the proximity sensor detects that the object has not left.

5. The backlight control method as claimed in claim 4, wherein in the activating the ambient light sensor, the proximity sensor is not activated yet.

6. A cell phone, comprising:
- a display configured to display images using a display brightness;
- an ambient light sensor configured to detect ambient light intensity;
- a proximity sensor configured to detect an object; and
- a processor configured to
  - activate the ambient light sensor to detect the ambient light intensity, without yet activating the proximity sensor, not activate the proximity sensor when the ambient light intensity detected by the ambient light sensor does not decrease, activate the proximity sensor to detect an object when the ambient light intensity detected by the ambient light sensor decreases to be lower than a predetermined value, maintain the display brightness due to that the decreasing of the ambient light intensity caused by the object, detected by the proximity sensor, blocking ambient light but not by weakening of the ambient light, detect an incoming signal and activate the ambient light sensor and the proximity sensor when the incoming signal is received, set the display brightness to zero when the proximity sensor detects the object, and adjust the display brightness according to the ambient light intensity detected by the ambient light sensor when the proximity sensor does not detect the object, wherein when the incoming signal is received and the proximity sensor detects the object, the processor is further configured to deactivate a button function and a touch control function, detect another incoming signal when the proximity sensor detects that the object has left, and set the backlight brightness to zero continuously when the proximity sensor detects that the object has not left.

7. The cell phone as claimed in claim 6, wherein the proximity sensor is a capacitive, an inductive, an electromagnetic, an optical, a microwave or an ultrasonic proximity sensor.

8. The cell phone as claimed in claim 6, wherein the proximity sensor is an optical proximity sensor and the portable electronic device further comprises an active light source configured to illuminate the object.

9. The cell phone as claimed in claim 6, wherein the ambient light sensor has a first surface and the proximity sensor has a second surface, wherein the first surface and the second further are at a same plane.

* * * * *